United States Patent
Obasih et al.

(10) Patent No.: US 10,256,514 B2
(45) Date of Patent: Apr. 9, 2019

(54) AIR COOLED THERMAL MANAGEMENT SYSTEM FOR HEV BATTERY PACK

(71) Applicant: Johnson Controls Technology LLC, Wilmington, DE (US)

(72) Inventors: Kem M. Obasih, Brookfield, WI (US); Richard M. DeKeuster, Racine, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 1505 days.

(21) Appl. No.: 13/854,629

(22) Filed: Apr. 1, 2013

(65) Prior Publication Data

US 2013/0273829 A1  Oct. 17, 2013

Related U.S. Application Data

(60) Provisional application No. 61/623,338, filed on Apr. 12, 2012.

(51) Int. Cl.
*H01M 10/06* (2006.01)
*H01M 10/625* (2014.01)
(Continued)

(52) U.S. Cl.
CPC ....... *H01M 10/625* (2015.04); *H01M 10/613* (2015.04); *H01M 10/617* (2015.04);
(Continued)

(58) Field of Classification Search
USPC ............................................ 454/284; 429/88
See application file for complete search history.

(56) References Cited

U.S. PATENT DOCUMENTS 4,578,324 A * 3/1986 Koehler .............. F28D 15/0275
  429/434
5,639,571 A * 6/1997 Waters ................ B60L 11/1874
  180/68.5

(Continued)

FOREIGN PATENT DOCUMENTS

DE 102008034855 A1 * 1/2010 ........ H01M 10/0436
DE 102008034885 A1 1/2010
(Continued)

OTHER PUBLICATIONS

DE 102008034885 (A1)—Jan. 28, 2010; Meintschel, Jens. Espacenet.com, European Patent Office.*

(Continued)

*Primary Examiner* — Gregory L Huson
*Assistant Examiner* — Frances F. Hamilton
(74) *Attorney, Agent, or Firm* — Fletcher Yoder, P.C.

(57) ABSTRACT

Systems are disclosed for battery modules/systems with cooling systems. In accordance with disclosed embodiments, the cooling system may be disposed against an external surface of a housing of the battery system. The cooling system may utilize air as a coolant to remove heat generated by cells within the battery module, to prevent the cells from aging prematurely. Embodiments of the cooling system may include manifolds, channels, fins, or a combination thereof, which may route the cooling air along the surface of the battery module housing. Such features may create an isothermal temperature distribution within the battery system.

17 Claims, 9 Drawing Sheets

(51) Int. Cl.
*H01M 10/6563* (2014.01)
*H01M 10/6556* (2014.01)
*H01M 10/6551* (2014.01)
*H01M 10/617* (2014.01)
*H01M 10/6566* (2014.01)
*H01M 10/613* (2014.01)

(52) U.S. Cl.
CPC ... *H01M 10/6551* (2015.04); *H01M 10/6556* (2015.04); *H01M 10/6563* (2015.04); *H01M 10/6566* (2015.04)

(56) References Cited

U.S. PATENT DOCUMENTS

| | | | | |
|---|---|---|---|---|
| 6,544,679 | B1 * | 4/2003 | Petillo | H01M 10/36 429/505 |
| 7,414,843 | B2 * | 8/2008 | Joshi | F28F 3/08 165/104.33 |
| 7,997,367 | B2 * | 8/2011 | Nakamura | H01M 2/1072 180/68.5 |
| 8,342,235 | B2 * | 1/2013 | Kanemaru | B60H 1/00328 165/174 |
| 8,439,104 | B2 * | 5/2013 | de la Cruz | F28D 1/05391 165/146 |
| 8,561,679 | B2 * | 10/2013 | Richardson | F28D 1/05383 165/149 |
| 8,584,738 | B2 * | 11/2013 | Hurlbert | F28D 1/0246 165/168 |
| 8,603,660 | B2 * | 12/2013 | Houchin-Miller | B60L 11/1874 429/120 |
| 8,609,268 | B2 * | 12/2013 | Fuhr | H01M 2/1077 429/120 |
| 8,662,148 | B2 * | 3/2014 | Wand | F25B 39/04 165/132 |
| 8,693,198 | B2 * | 4/2014 | Eckberg | H05K 7/20781 165/104.33 |
| 8,733,427 | B2 * | 5/2014 | So | F28D 1/0246 165/140 |
| 8,852,778 | B2 * | 10/2014 | Payne | F28F 27/00 429/120 |
| 8,869,877 | B2 * | 10/2014 | Zaffetti | F28F 3/12 165/168 |
| 8,968,904 | B2 * | 3/2015 | Han | H01M 2/1072 429/120 |
| 9,070,958 | B2 * | 6/2015 | Obasih | H01M 10/625 |
| 9,350,002 | B2 * | 5/2016 | Fuhr | H01M 2/1077 |
| 9,437,903 | B2 * | 9/2016 | DeKeuster | B60L 11/1874 |
| 2002/0195234 | A1 * | 12/2002 | Wu | F25B 39/022 165/144 |
| 2008/0138670 | A1 | 6/2008 | Johnston et al. | |
| 2009/0023056 | A1 * | 1/2009 | Adams | B60L 11/1872 429/120 |
| 2009/0023405 | A1 * | 1/2009 | Forstner | G01S 7/034 455/115.1 |
| 2009/0074627 | A1 * | 3/2009 | Fitzgerald | B01J 19/0093 422/129 |
| 2010/0297486 | A1 * | 11/2010 | Fujii | H01M 10/625 429/120 |
| 2011/0061845 | A1 * | 3/2011 | Wand | F25B 39/04 165/173 |
| 2011/0262794 | A1 * | 10/2011 | Yoon | H01M 10/486 429/120 |
| 2011/0269008 | A1 * | 11/2011 | Houchin-Miller | B60L 11/1874 429/120 |
| 2012/0012300 | A1 * | 1/2012 | Dunn | G02F 1/133385 165/287 |
| 2012/0148889 | A1 * | 6/2012 | Fuhr | H01M 2/1077 429/87 |
| 2012/0175100 | A1 * | 7/2012 | Bezama | F28F 3/12 165/181 |
| 2012/0177971 | A1 * | 7/2012 | Cicero | H01M 2/1077 429/120 |
| 2012/0308860 | A1 * | 12/2012 | Pizzurro | H01M 2/1077 429/89 |
| 2013/0071720 | A1 * | 3/2013 | Zahn | H01M 2/1077 429/120 |
| 2013/0183555 | A1 * | 7/2013 | Boddakayala | H01M 2/1077 429/72 |
| 2013/0192807 | A1 * | 8/2013 | DeKeuster | B60L 11/1874 165/170 |

FOREIGN PATENT DOCUMENTS

| | | | | |
|---|---|---|---|---|
| EP | 2017918 A1 * | 1/2009 | | H01M 2/1072 |
| EP | 2149771 A1 * | 2/2010 | | B60H 1/00278 |
| EP | 2388851 A1 * | 11/2011 | | F28D 1/05383 |
| WO | 2010/148224 A2 | 12/2010 | | |
| WO | WO 2010148224 A2 * | 12/2010 | | H01M 2/1077 |
| WO | WO 2010148224 A3 * | 4/2011 | | H01M 2/1077 |

OTHER PUBLICATIONS

International Search Report & Written Opinion for PCT Application No. PCT/US2013/035157 dated Jun. 28, 2013, 12 pgs.

* cited by examiner

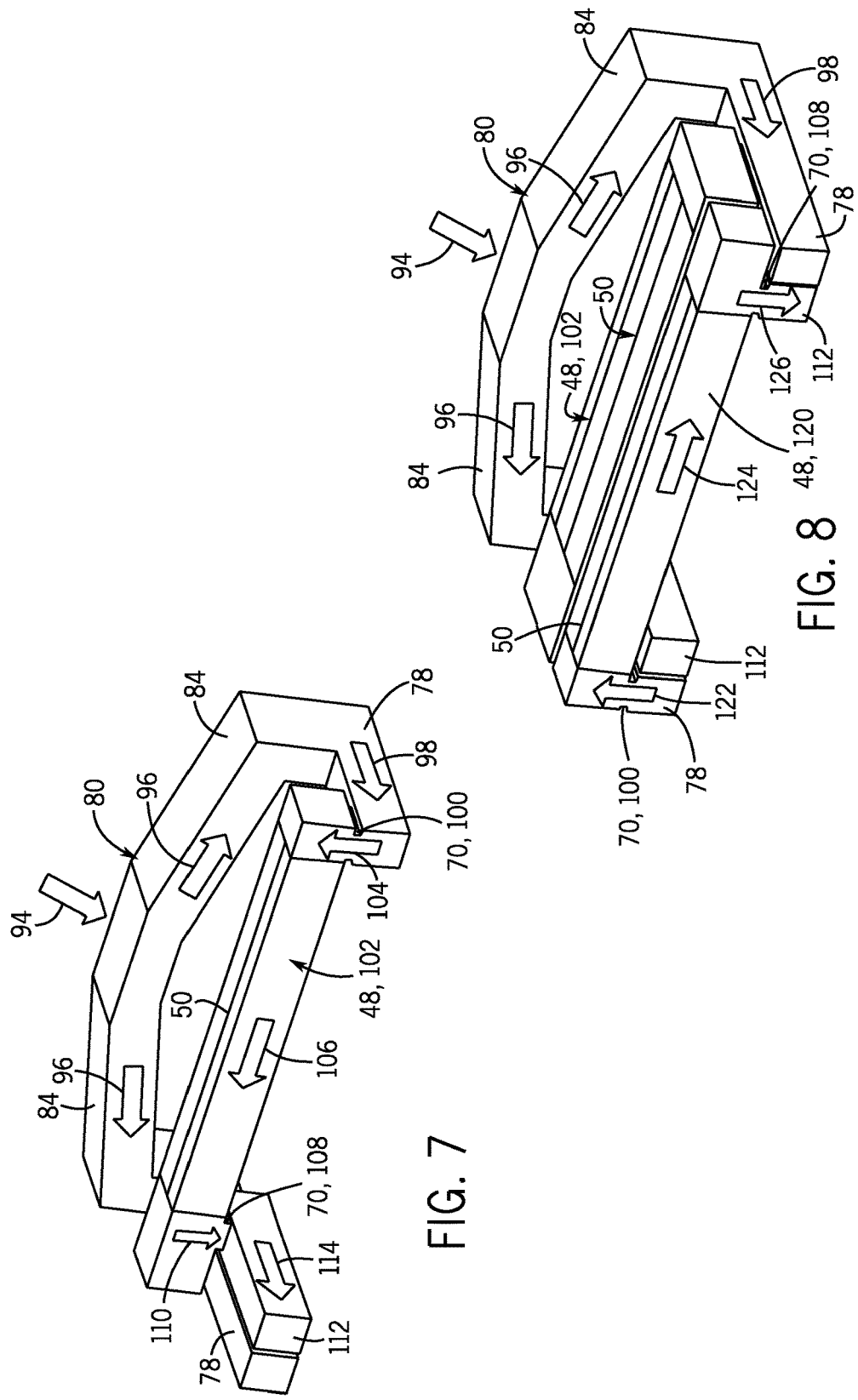

AIR COOLED THERMAL MANAGEMENT SYSTEM FOR HEV BATTERY PACK

CROSS REFERENCE TO RELATED APPLICATIONS

This application claims priority from and the benefit of U.S. Provisional Application Ser. No. 61/623,338, entitled "Air Cooled Thermal Management System for HEV Battery Pack," filed Apr. 12, 2012, which is hereby incorporated by reference for all purposes.

FIELD OF THE DISCLOSURE

The present disclosure relates generally to the field of batteries and battery modules. More specifically, the present disclosure relates to an air cooled thermal management system for battery modules that may be used particularly in vehicular contexts, as well as other applications.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles using electric power for all or a portion of their motive power may provide numerous advantages as compared to traditional vehicles powered by internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles. For example, it is desirable to provide effective cooling to the battery modules to prevent premature aging of individual battery cells within the battery module, while simultaneously minimizing the cost of the battery module. It is also desirable to provide a cooling system design that can utilize cabin air as an effective coolant.

Vehicles using electric power for at least a portion of their motive force may derive their electric power from the multiple individual battery cells packaged into the battery modules. The individual cells may utilize lithium-ion chemistry and may be packaged into prismatic casings. The battery modules may contain the multiple individual cells within a generally rectangular housing. As the individual cells are charged and discharged, they may generate heat due to Joule heating caused by current flowing through the internal resistance of the cells. In addition, the individual cells may be subjected to heating via exothermic chemical reactions occurring within the cells. Further, in some cases, elevated ambient temperatures may add heat to the cells via conduction, convection, and/or radiation. These (and other potential) sources of thermo-electrical, thermo-chemical, and environmental heating may cause increased localized temperatures of the cells. The increase in temperature may be aggravated by the tight packaging of multiple cells within the confined space of the battery module housing. Increased temperatures may increase the rate of chemical reactions, cause physical distortion (e.g., swelling, short circuits, open circuits), that may exponentially age the cells and the battery module. Accordingly, it would be desirable to provide an effective cooling system to draw excess heat away from the module, thereby creating an isothermal temperature distribution along the cells in a module or battery pack to preserve the cells.

Further, it may be advantageous to utilize air as the coolant within the cooling system. Typical cooling systems may use a liquid coolant looped from the engine to the battery of the vehicle. However, liquid coolants may be disadvantageous in vehicular systems, which heavily rely on electronic components. For example, a liquid coolant leak may damage any electronic components contacted. Further, liquid coolants are more dense than air, resulting in increased weight and cost associated with liquid coolant based systems. Additionally, use of a liquid coolant requires an additional fluid stream within the vehicle, whereas air may be cycled throughout the cabin and the cooling system, reducing the number of fluids circling through the vehicle. Accordingly, it would be desirable to provide a cooling system that effectively uses air to create the isothermal temperature distribution along the cells.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present systems may be adapted to a wide range of settings and may be particularly well suited to vehicles deriving at least a portion of their motive force from electric power. Moreover, the cooling systems may be useful in other applications, such as power storage for alternative energy sources, portable battery modules, and back-up power supplies.

Embodiments of the present disclosure relate to cooling systems for battery modules having multiple individual battery cells. In accordance with disclosed embodiments, the cooling system may include a battery pack contained within a thermally conductive housing. The housing may be placed in physical contact with a plurality of heat sink fins to draw away heat generated by the multiple battery cells. Further, a manifold flow distribution system may direct cooling air through the heat sink fins to augment the heat transfer provided by the fins.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

DRAWINGS

Various aspects of this disclosure may be better understood upon reading the following detailed description and upon reference to the drawings in which:

FIG. 7 is a cross-sectional view of an inlet portion of an embodiment of the manifold flow distribution system, depicting the air flow route along the first cross-flow section;

FIG. 8 is a cross-sectional view of the inlet portion of the manifold flow distribution system, depicting the air flow route along the second cross-flow section;

DETAILED DESCRIPTION

Figure 1:
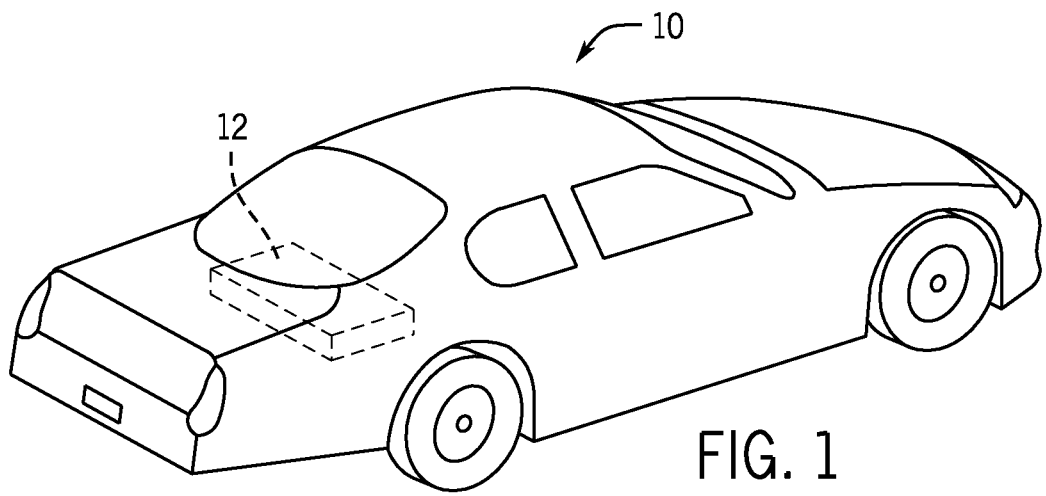
FIG. 1 is a perspective view of an embodiment of a vehicle having a battery module contributing all or a portion of the motive power for the vehicle.

The term "xEV" is defined herein to include vehicles that use electric power for all or a portion of their vehicular motive force, including, but not limited to, the following vehicles. As will be appreciated by those skilled in the art, hybrid electric vehicles (HEVs) combine an internal combustion engine propulsion system and a battery-powered electric propulsion system. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses one or more motors powered by electric energy for its propulsion.

As described in more detail below, disclosed herein are embodiments of air cooled systems for battery systems and/or modules, which may be well suited to xEV applications. Embodiments of the air cooled system provided herein may include a manifold flow distribution system. The manifold flow distribution system may be physically contacting a housing of the battery system and may include a plurality of fins arranged within manifolds of the air cooled system. Further, the manifold flow distribution system may direct cool air in a specific manner along the battery system. The cooling system described herein may generate an isothermal temperature distribution along the battery system. Further, the cooling system may isolate the cells from the air flow route, such that in the event of an effluent release from the cells, the air is not contaminated by effluent.

The battery systems that include the cooling system may be easily configured for use in xEVs. In certain embodiments, the xEV may include at least one battery system, and each battery system may include the cooling system to remove excess heat and prevent premature aging of the individual cells within the battery systems. Removing heat from the modules, and consequently the individual cells, may enable the cells to facilitate higher currents without exceeding set temperature limits. Further, the removed heat may be recovered and repurposed for other applications throughout the xEV. For example, the waste heat may be used to warm the passenger compartment or defrost the windshield during cold weather.

Turning now to the drawings, FIG. 1 is a perspective view of a vehicle 10 in the form of an automobile (e.g., a car) having a battery system 12 for contributing all or a portion of the motive power for the vehicle 10. The battery system 12 may be constructed from multiple individual cells and may include one or more cooling systems as described above. Although illustrated as an automobile in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power. For the purposes of the present disclosure, it should be noted that the battery system 12 and battery system accessories illustrated and described herein are particularly directed to providing and/or storing energy in xEVs. However, embodiments of the battery system 12 having the cooling systems may be utilized in other, non-vehicular applications as well.

Further, although the battery system 12 is illustrated in FIG. 1 as being positioned in the trunk or rear of the vehicle 10, according to other embodiments, the location of the battery system 12 may differ. For example, the position of the battery system 12 may be selected based on the available space within the vehicle 10, the desired weight balance of the vehicle 10, the location of other components within the vehicle 10, and a variety of other implementation-specific considerations.

Figure 2:
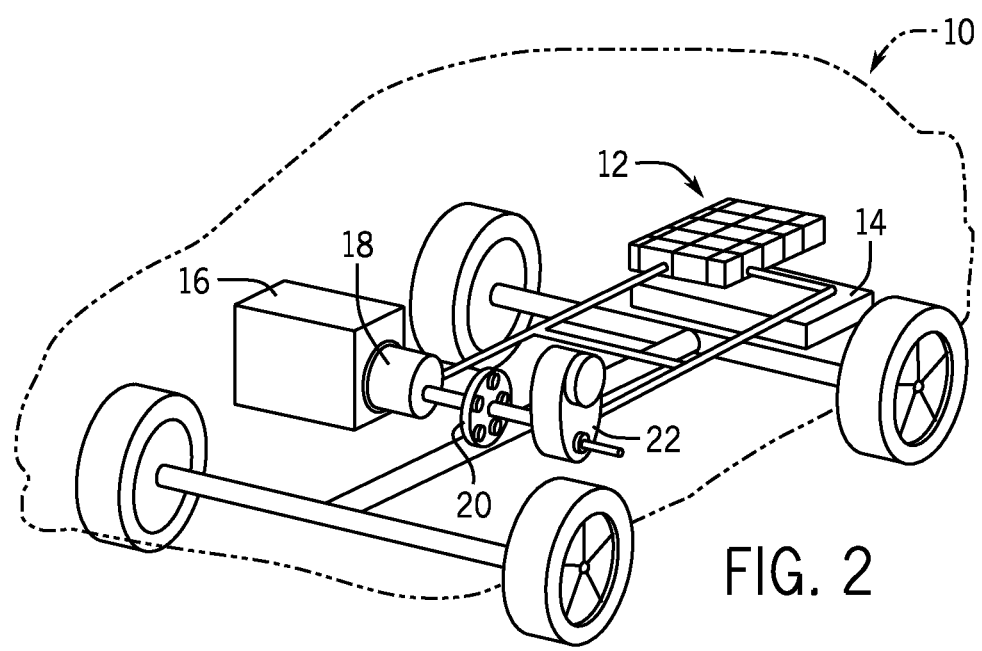
FIG. 2 illustrates a cutaway schematic view of an embodiment of the vehicle of FIG. 1 provided in the form of a hybrid electric vehicle (HEV)

For purposes of discussion, it may be helpful to discuss the battery system 12 with respect to a particular type of xEV, for example, an HEV. FIG. 2 illustrates a cutaway schematic of the vehicle 10 provided in the form of an HEV. In the illustrated embodiment, the battery system 12 is provided toward the rear of the vehicle 10 near a fuel tank 14. The fuel tank 14 supplies fuel to an internal combustion engine 16, which is provided for the instances when the HEV utilizes gasoline power to propel the vehicle 10. An electric motor 18, a power split device 20, and a generator 22 are also provided as part of the vehicle drive system. Such an HEV may be powered or driven by only the battery system 12, by only the engine 16, or by both the battery system 12 and the engine 16.

Figure 3:
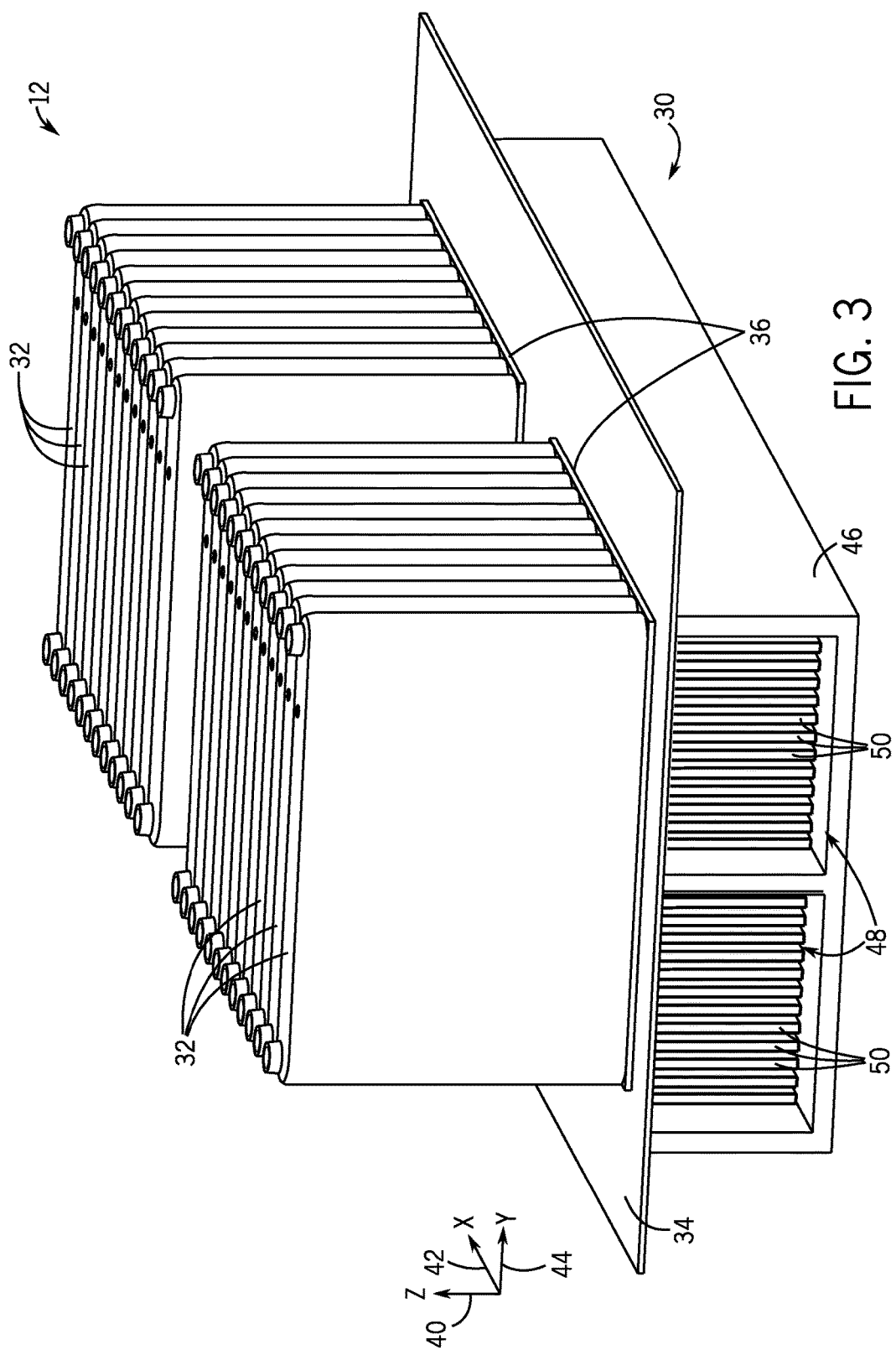
FIG. 3 is a schematic view of an embodiment of a plurality of cells having a cooling system.

As previously described, each battery system 12 may include a cooling system that removes excess heat generated by the individual cells within a housing of the battery system 12. A basic schematic of a battery system 12 having such a cooling system 30 is illustrated in FIG. 3. The battery system 12 may include multiple individual cells 32 contained within a housing 34 (here, shown simply as a plate for clarity). In actuality, the housing 34 may entirely enclose the multiple cells 32. Although picture in prismatic form, the cells 32 may be cylindrical in alternative embodiments. Further, the housing 34 may accommodate any number of cells 32, as determined by implementation-specific considerations. The cells 32 may be physically contacting the housing 34, such that heat generated by the cells 32 is conductively transferred to the housing 34. Accordingly, the casing of the cells 32 and the housing 34 may be in conductive contact. Such contact may include a thermal gap pad 36 at locations where the cells 32 contact the housing 34. The thermal gap pads 36 may aid in providing an effective thermal interface between the cooling system 30 and the cells 32. For example, the thermal gap pads 36 may create a more homogenous surface topography, resulting in increased surface contact between the cells 32 and the housing 34.

As depicted, the cooling system 30 may be disposed beneath the portion of the housing 34 contacting the cells 32. Particularly, when the cells 32 are in prismatic form, it may be advantageous to place the cooling system 30 directly beneath the battery system 12 due to high thermal conductivity of the cells 32 in the z-direction 40, as opposed to the x-direction 42 and the y-direction 44. For example, the coefficient of thermal conductivity may be approximately 3 to 7 times larger in the z-direction 40 as compared to the x-direction 42 and the y-direction 44. However, in alternative embodiments, the cooling system 30 may be disposed against any external surface of the housing 34 of the battery system 12. For example, the cooling system 30 may be disposed against a different external surface of the housing 34 due to space constraints within the vehicle 10.

The cooling system 30 may include a cover plate 46 having multiple channels 48 within it. The channels 48 may each house a fin section 50. In particular embodiments, the fin sections 50 may be folded fins, each section 50 formed from a single piece of material with multiple convolutions. The fin sections 50 may be a separate component from the cover plate 46, simply fitting within the channels 48 of the cover plate 46. In certain embodiments, the fin sections 50 may be attached directly to an external surface of the housing 34 with the cover plate 46 then disposed around the fin sections 50, enclosing them. To enhance the heat transfer achieved by the fin sections 50, the channels 48 of the cover plate 46 may also circulate air as a coolant. The addition of the circulating air may provide high cooling rates via increased convective heat transfer from the fin sections 50. Using air as the coolant may aid in reducing weight of the cooling system 30, minimizing cost of the cooling system 30, and simplifying internal systems of the vehicle 10.

The cooling system 30, having the separate fin sections 50 and the cover plate 46, may provide a flexible, cost-effective design that may be easily adapted for a variety of battery systems 12. The dimensions of the cover plate 46 may be easily scaled to fit the dimensions of the associated battery system 12. Further, for battery modules 12 that generate more heat, the cooling air may be circulated at a higher speed and/or injected into the channels 48 at a lower temperature. Further, the number and spacing of the fins within the sections 50 may be adjusted to provide optimal heat transfer qualities.

Figure 4:
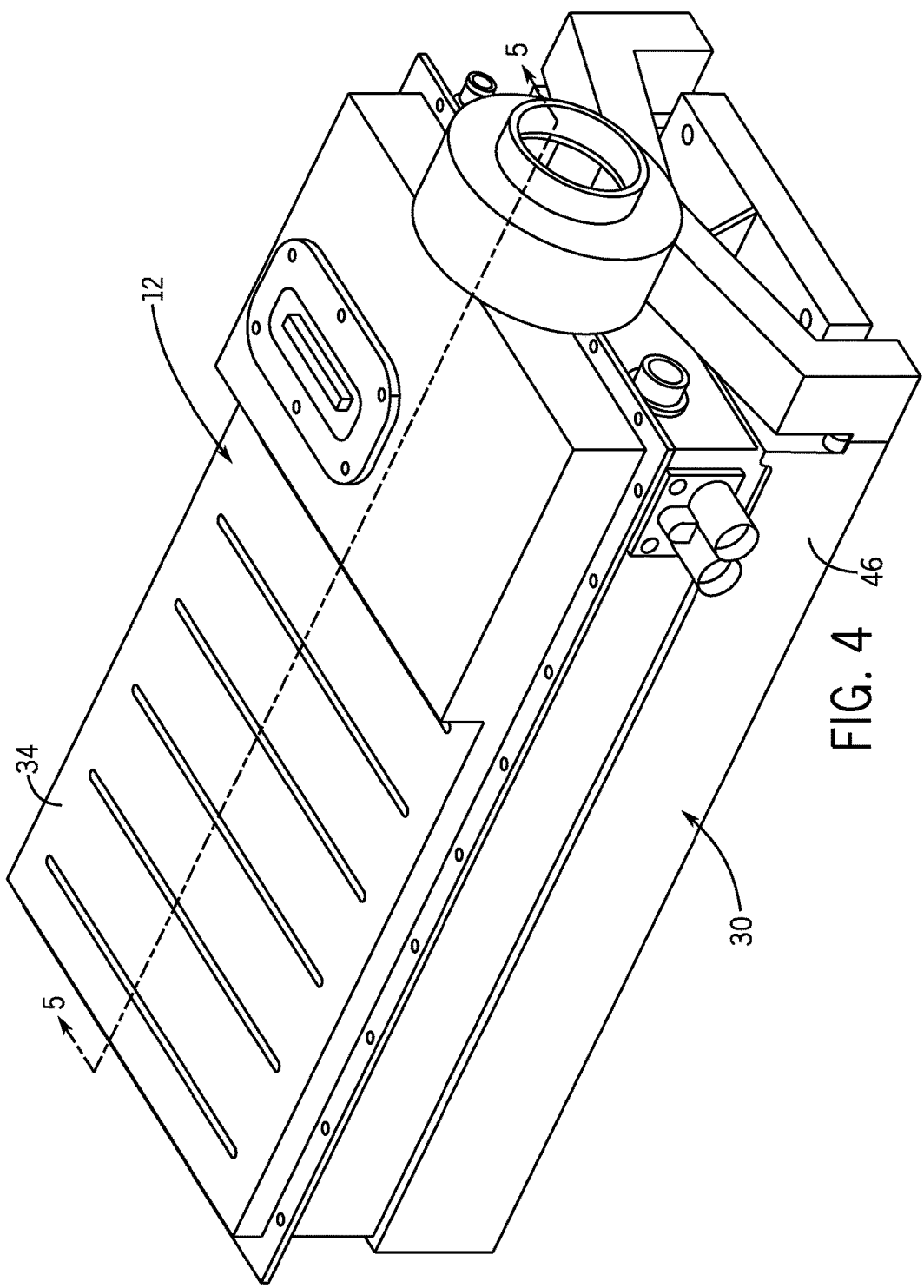
FIG. 4 is a perspective view of an embodiment of a battery pack having a cooling system with a manifold flow distribution system.

A perspective view of the entire battery system 12 and cooling system 30 is presented in FIG. 4. As shown, the housing 34 completely encloses the battery system 12, such that the cells 32 are completely contained within the housing 34. Particularly, the cooling air may be isolated from the cells 32, such that effluent from a potential over-pressurization of a cell 32 does not contaminate the cooling air. In this way, cabin air from the vehicle 10 may be used as the cooling air, simplifying fluid routes throughout the vehicle 10.

Accordingly, the housing 34 may be formed from a thermally conductive material, which enables heat generated by the cells 32 to be drawn away by the cooling system 30. For example, the housing 34 may be constructed from titanium (and alloys), steel, aluminum (and alloys), brass, carbon composites, or another thermally conductive material. Additionally, the fin sections 50 may be formed from a thermally conductive material, such that they draw heat from the cells 32 via the housing 34. The fin sections 50 may be aluminum (and alloys), copper (and alloys), carbon composites, or another thermally conductive material. Materials may be selected based on implementation-specific considerations, such as cost, weight, availability, thermal conductivity, or a combination thereof.

Figure 5:
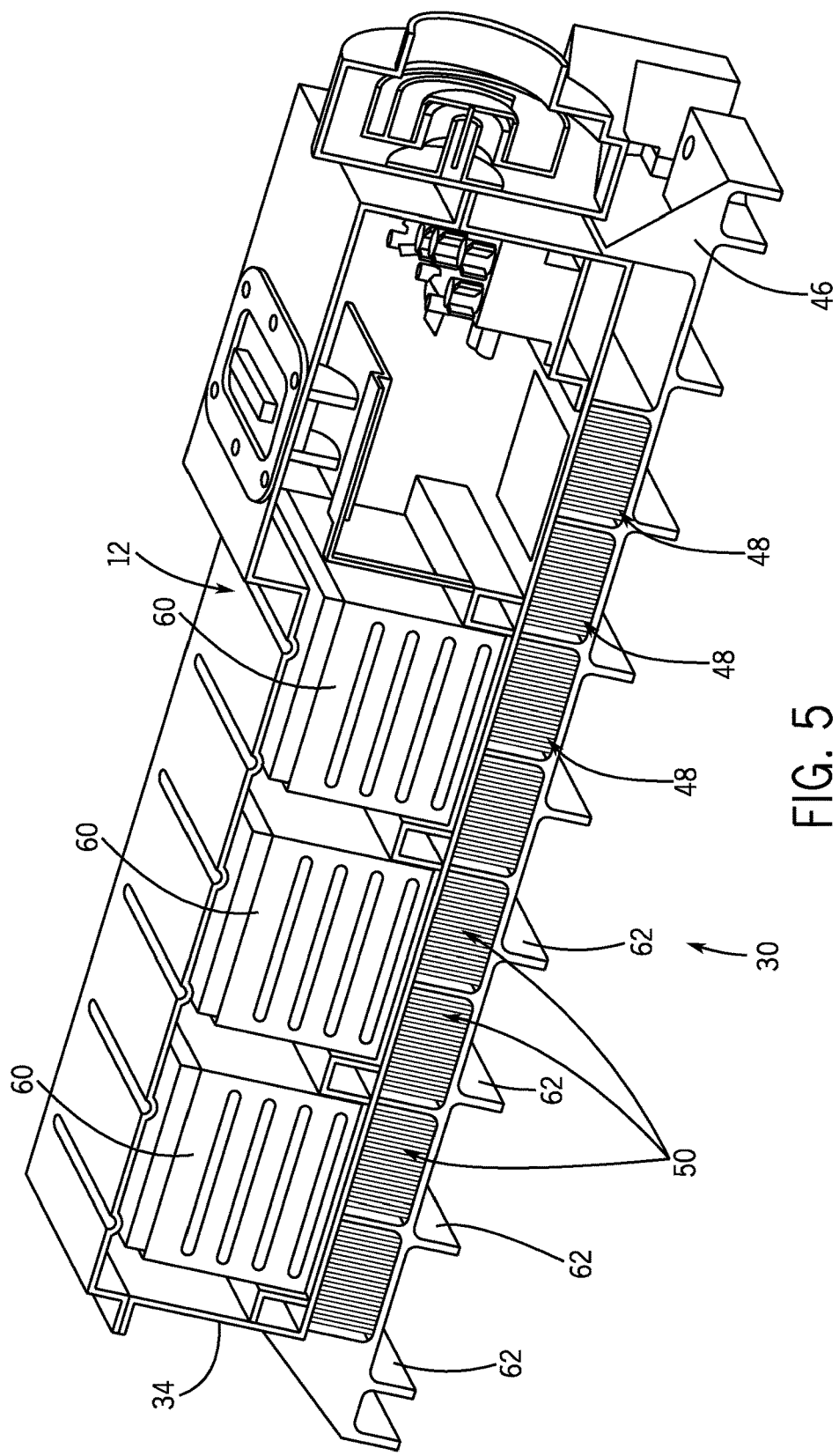
FIG. 5 is a cross-sectional view of the battery pack and associated cooling system, taken along line 5-5 of FIG. 4.

To provide a better understanding of the internal arrangement of the battery system 12 and the cooling system 30, a cross-sectional view is depicted in FIG. 5. As shown, the battery system 12 may include multiple battery modules 60, which may each house multiple cells 32. The battery modules 60 may be arranged within the housing 34 such that the bottoms of the battery modules 60 are in thermally conductive contact with the cooling system 30. Thus, heat generated by the cells 32 may be sequentially conducted to the battery module 60, the housing 34, and the fin sections 50. Additionally, cooling air circulating through the channels 48 may convectively remove heat from the fin sections 50, increasing the overall heat transfer rate from the cells 32. Further, the bottom surface of the cover plate 46 may include fins 62, which may remove heat from the channels 48, enabling the channels 48 to draw more heat away from the cells 32.

Figure 6:
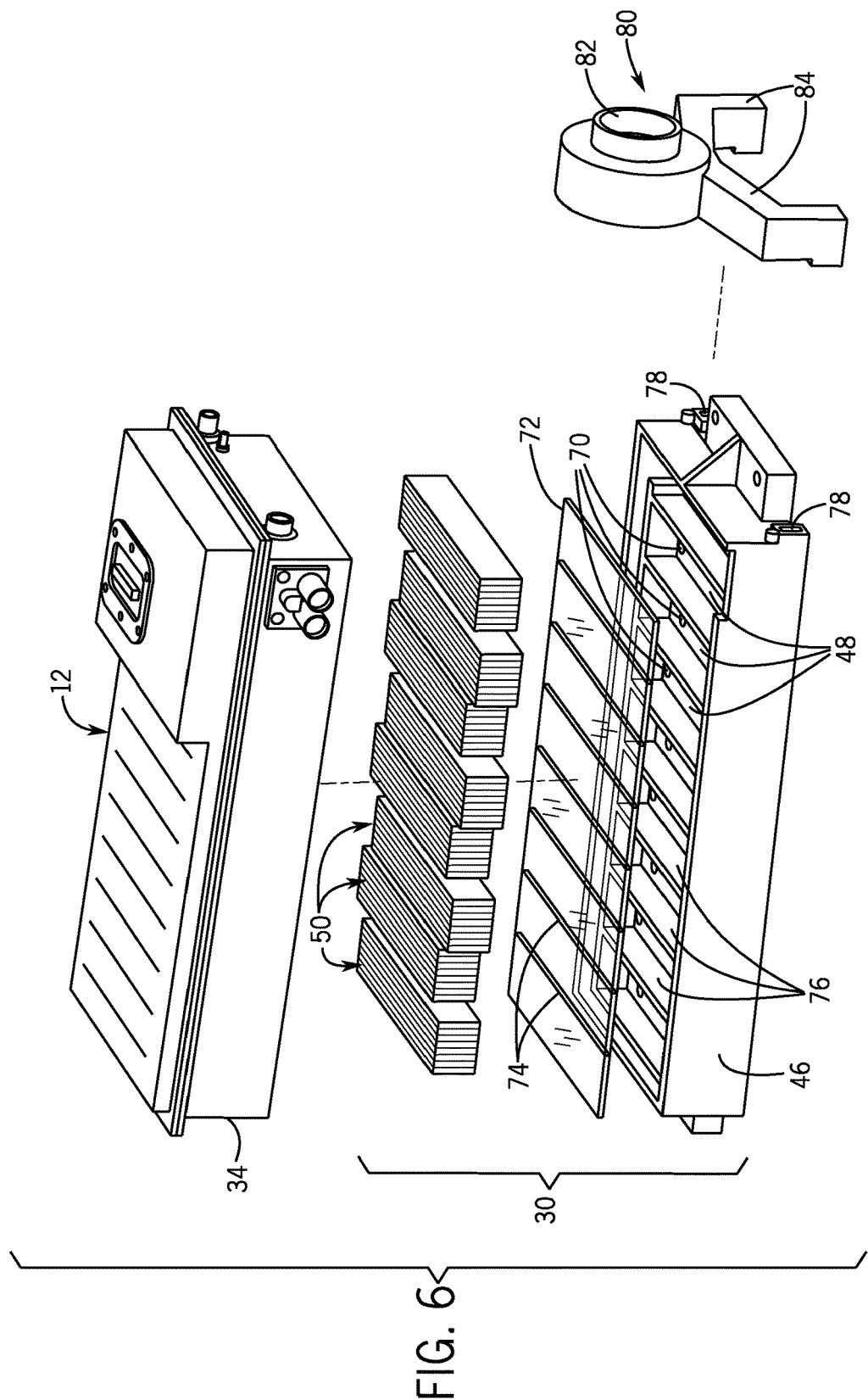
FIG. 6 is an exploded view of the battery pack and associated cooling system of FIG. 4.

An exploded view of the cooling system 30 is depicted in FIG. 6, detailing the components included in the system 30. As previously described, the fin sections 50 fit within the channels 48 of the cover plate 46. In the depicted embodiment, the cover plate 46 includes eight channels 48 oriented cross-wise to the length of the cover plate 46. Accordingly, each channel 48 includes the fin section 50. However, in alternative embodiments, the cover plate 46 may include more or fewer channels 48 in different configurations.

As detailed further below, each channel 48 may include a pair of apertures 70, wherein one aperture 70 acts as a cooling air inlet to the channel 48 and one aperture 70 acts as a cooing air outlet to the channel 48. The apertures 70 are depicted as ellipses, but may have a different geometry in alternative embodiments. A gasket 72 may be disposed between the bottom surface of the housing 34 of the battery system 12 and the cover plate 46. The gasket 72 may include portions 74 that align with walls 76 of the channels 48, such that cooling air does not pass between different channels 48. The gasket 72 may aid in ensuring that the cooling air remains contained within the cooling system 30 and distinctly separate from the cells 32.

To supply the channels 48 with cooling air, the cover plate 46 may include an inlet manifold 78 along its length on each side. In this way, flow within the inlet manifolds 78 may be perpendicular to flow within the channels 48. In each channel 48, one of the apertures 70 may provide a fluid connection between one of the inlet manifolds 78 and the respective channel 48. Subsequently, the cooling air may exit the channel 48 via the other aperture 70. The inlet manifolds 78 may be supplied with cooling air by an inlet header 80. The inlet header 80 may have an intake orifice 82, where cooling air enters the cooling system 30. The intake orifice 82 may then split the cooling air into two branches 84. Each branch 84 may feed cooling air to one of the inlet manifolds 78. In certain embodiments, the inlet header 80 may include a fan (not shown) to increase the speed of the cooling air as it travels through the branches 84 and the inlet manifolds 78.

To aid in the explanation of the cooling air flow through the inlet header 80, manifolds 78, and channels 48 of the cooling system 30, FIGS. 7 and 8 provide a schematic depiction of the path taken by the cooling air. As indicated by arrows 94, the cooling air enters the cooling system 30 via the intake orifice 82. The cooling air may then split and traverse the right and left branches 84, depicted by arrows 96. From each branch 84, the cooling air may enter the respective right and left inlet manifolds 78, located along each side of the cooling system 30 (arrows 98).

As depicted in FIG. 7, the cooling air flows through one of the apertures 70, specifically, an inlet aperture 100, and into the first channel 102 (arrow 104) on the right side of the cooling system 30. The cooling air proceeds through the first channel 102, from right to left (following arrow 106), travelling parallel to the orientation of the fin sections 50. Once at the left end of the first channel 102, the cooling air (now warmed via convection from the fin sections 50) flows through the other aperture 70, which is an outlet aperture 108 (arrow 110). The used air then proceeds to an outlet manifold 112, which conveys the used air out of the cooling system 30 (arrow 114). As shown, the outlet manifold 112 may be adjacent to the inlet manifold 78.

The cooling air may enter adjacent channels 48 from opposite sides of the cooling system 30, as shown in FIG. 8. For example, a second channel 120 may have the inlet aperture 100 on the left and the outlet aperture 108 on the right, opposite of the respective apertures 100, 108 in the first channel 102. Accordingly, to reach the second channel 120, the cooling air may travel through the left inlet manifold 78 and through the inlet aperture 100 on the left end of the second channel 120 (arrow 122). The cooling air may then flow from left to right, following arrow 124, through the second channel 120. As the cooling air travels through the second channel 120, it convectively removes heat from the fin section 50 contained within the channel 120. The used air then follows arrow 126 into the right outlet manifold 112. The outlet manifold 112 may then direct the warm air out of the cooling system 30.

Figure 9:
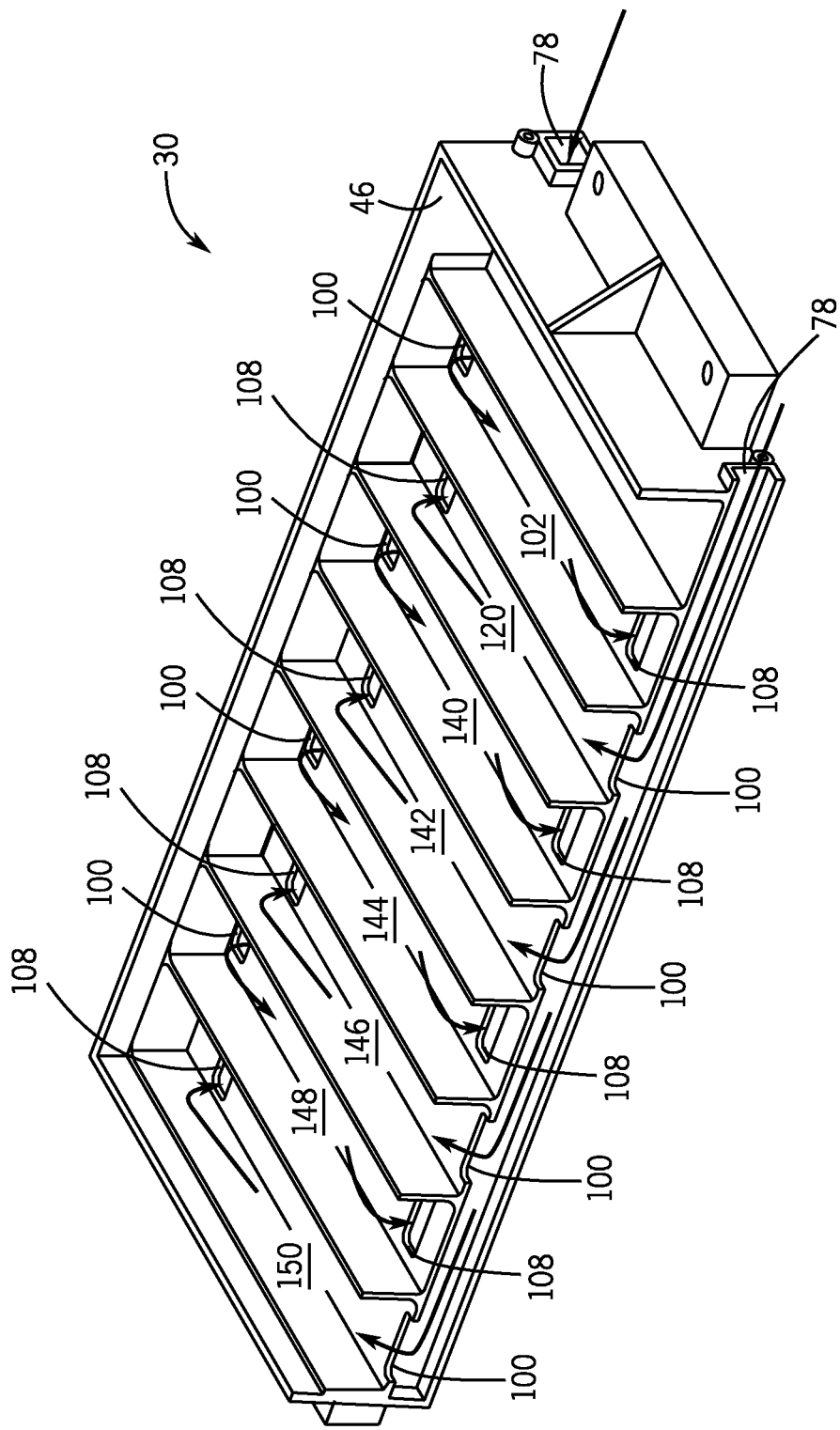
FIG. 9 is a perspective view of an embodiment of the cover plate of the flow distribution system.

The flow path for all eight channels 48 is depicted in FIG. 9. The unused cooling air may be represented by the thick arrows, and the used (warmer) air may be represented by the thin arrows. As shown, the inlet apertures 100 are arranged such that cooling air enters alternating channels 120, 142, 146, and 150 from the right inlet manifold 78. Accordingly, the remaining channels 102, 140, 144, and 148 receive cooling air from the left inlet manifold 78. The used air exits each channel 48 via the outlet aperture 108. In this way, the flow in each channel 48 is moving in the opposite direction of the flow in adjacent channels 48. As detailed below, this arrangement may balance the flow of the cooling air and the used air to create an isothermal temperature distribution along the cooling system 30.

Figure 10:
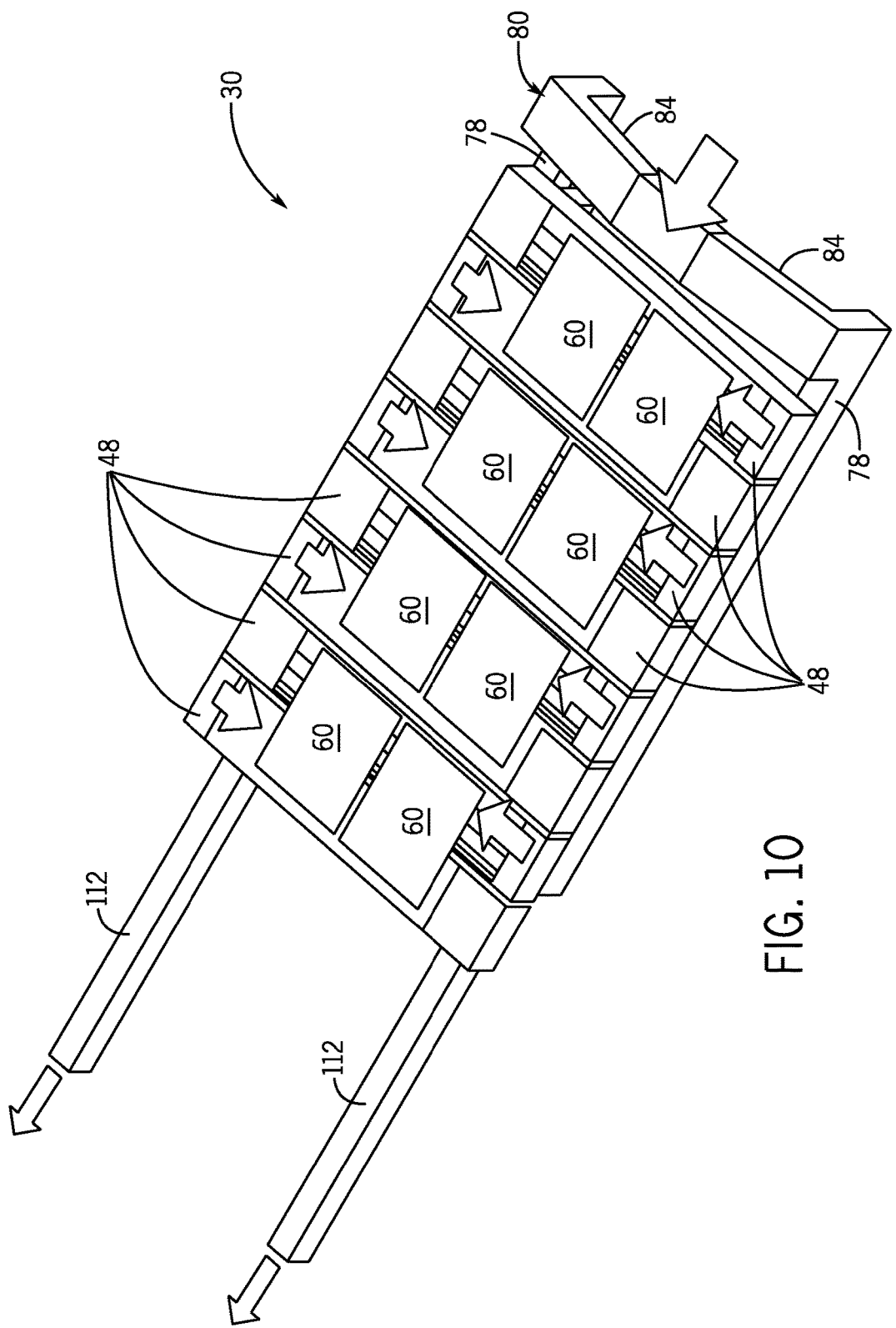
FIG. 10 is a schematic of the manifold flow distribution system, depicting air flow route along the battery modules.

The flow path of the cooling air with respect to the positioning of multiple battery modules 60 is provided in FIG. 10. The depicted embodiment is shown having eight battery modules 60; however, the cooling system 30 may be adapted for any number of battery modules 60. As shown, the battery modules 60 are arranged in pairs along the length of the cooling system 30. Further, each battery module 60 may be positioned over two adjacent channels 48. In this way, each battery module 60 is positioned over a pair of channels 48 in counter-flow (e.g., one channel 48 flows air left to right and the other channel 48 flows air right to left). This arrangement of the battery modules 60 relative to the channels 48 may be desirable to create an isothermal temperature distribution among the battery modules 60. For example, by positioning each battery module 60 such that it encounters counter-flow channels 48, the average temperature under each battery module 60 may be approximately equal, resulting in a negligible temperature differential among the modules 60.

Additionally, the inlet manifolds 78, which contain the cooling air supply, are maintained separately from the outlet manifolds 112, which contain the used, warmer air. In this way, each channel 48 receives the cooling air directly, enabling the cooling air to enter each channel 48 at approximately the same temperature. Since each channel 48 receives cooling air at approximately the same temperature, each channel 48 may be able to achieve an approximately equal amount of heat transfer from the battery modules 60, resulting in generally equal temperatures among the battery modules 60.

Further, the dimensions of the channels 48 with respect to the inlet manifold 78 may also aid in creating the isothermal temperature distribution by ensuring that each channel 48 receives an adequate amount of cooling air. For example, the cross-sectional area of each inlet manifold 78 may be at least four times the cross-sectional area of each channel 48. In this way, each channel 48 may receive approximately the same amount of cooling air, resulting in even cooling of the battery modules 60.

Figure 11:
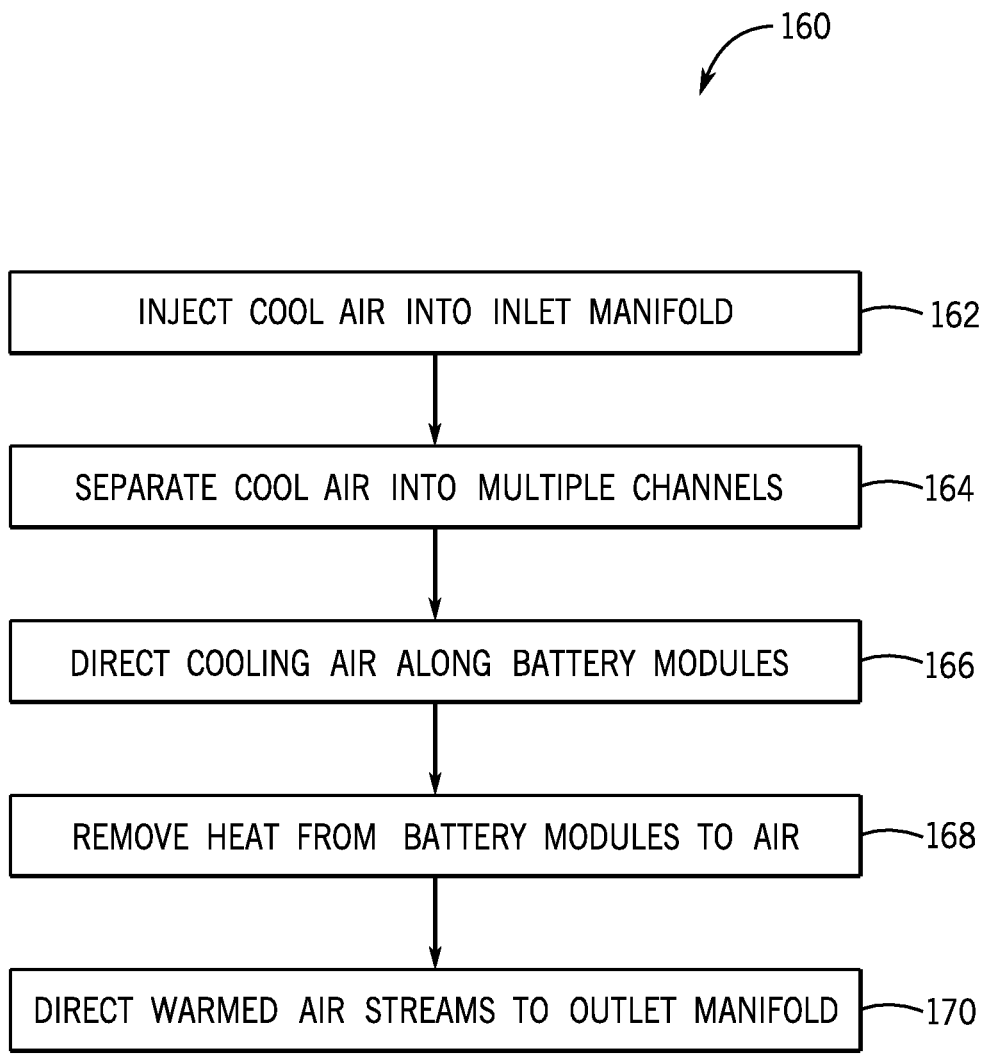
FIG. 11 is a block flow diagram describing the method of operation of the cooling system.

As previously described, the cooling system 30 may create an isothermal temperature distribution among the battery modules 60 of the battery system 12. In this way, the product life and functionality of the cells 32 within the battery modules 60 may be maintained. A method 160 of operation that may be utilized by the cooling system 30 is outlined in FIG. 11. The cooling system 30 may inject cooling air into inlet manifolds 78 via the inlet header 80 (block 162). From the inlet manifolds 78, the cooling air may be directed into the channels 48 of the cooling system 30 via inlet apertures 100 (block 164). The channels 48 may be disposed beneath the battery modules 60, such that the cooling air is directed along the battery modules 60 (block 166). As the cooling air travels through the channels 48, heat generated by the cells 32 within the modules 60 may be convectively transferred to the air from the fin sections 50 disposed within the channels 48 (block 168). The used (warm) air may exit each channel 48 via the outlet aperture 108, entering the outlet manifold 112 (block 170). The used air may then be circulated elsewhere through the vehicle 10, such as the cabin for heating or defrosting. The used air may also be re-cooled and cycled through the cooling system 30 repetitively.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system having a cooling system, wherein the cooling system comprises:
   a cover plate formed from a conductive material;
   a plurality of channels disposed within the cover plate;
   a pair of inlet manifolds configured to convey a coolant into the plurality of channels of the cooling system, wherein a first inlet manifold of the pair of inlet manifolds extends along a first side of the cover plate, wherein a second inlet manifold of the pair of inlet manifolds extends along a second side of the cover plate, and wherein the plurality of channels extends between the first and second sides of the cover plate, wherein the plurality of channels extends over the first inlet manifold and the second inlet manifold, such that an inlet aperture into each respective channel of the plurality of channels opens downwardly into, and fluidly couples the respective channel to, either the first inlet manifold or the second inlet manifold; and
   a pair of outlet manifolds configured to convey the coolant out of the plurality of channels.

2. The battery system of claim 1, wherein a first channel of the plurality of channels is coupled to the first inlet manifold and configured to direct the coolant in a first direction, and wherein a second channel of the plurality of channels, adjacent to the first channel, is coupled to the second inlet manifold and configured to direct the coolant in a second direction opposite to the first direction.

3. The battery system of claim 1, wherein the cooling system comprises fins extending from a bottom of the cover plate.

4. The battery system of claim 1, wherein each respective channel of the plurality of channels of the cooling system comprises an outlet aperture disposed along the respective channel on an opposing end from the inlet aperture of the respective channel, and wherein the outlet aperture is fluidly coupled to either a first outlet manifold of the pair of outlet manifolds or a second outlet manifold of the pair of outlet manifolds.

5. The battery system of claim 1, wherein a first channel of the plurality of channels couples with the first inlet manifold but not the second inlet manifold, wherein a second channel of the plurality of channels is adjacent to the first channel and couples with the second inlet manifold but not the first inlet manifold, wherein a third channel of the plurality of channels is adjacent to the second channel such that the second channel is disposed between the first channel and the third channel, and wherein the third channel couples with the first inlet manifold but not the second inlet manifold.

6. The battery system of claim 1, wherein the pair of outlet manifolds is disposed between the first inlet manifold of the pair of inlet manifolds and the second inlet manifold of the pair of inlet manifolds.

7. The battery system of claim 1, wherein the pair of outlet manifolds comprises a first outlet manifold and a second outlet manifold, wherein the first inlet manifold is disposed adjacent to, and separate from, the first outlet manifold, and wherein the second inlet manifold is disposed adjacent to, and separate from, the second outlet manifold.

8. The battery system of claim 7, comprising:
   a first distance between the first inlet manifold and the second inlet manifold; and
   a second distance between the first outlet manifold and the second outlet manifold, wherein the first distance is greater than the second distance.

9. The battery system of claim 1, wherein the first inlet manifold and the second inlet manifold extend along a perimeter of the cover plate, and wherein the pair of outlet manifolds extend along the cover plate inward from the perimeter of the cover plate.

10. The battery system of claim 1, wherein the first inlet manifold comprises a first cross-sectional width extending transverse to the first side of the cover plate, wherein the second inlet manifold comprises a second cross-sectional width extending transverse to the second side of the cover, and wherein the first cross-sectional width is substantially equal to the second cross-sectional width.

11. A system, comprising:
   a battery system, comprising:
      a housing configured to enclose the battery system and formed from a conductive material; and
      a plurality of battery modules, each battery module of the plurality of battery modules having a plurality of electrochemical cells; and
   a cooling system disposed on an outside of the housing of the battery system, comprising:
      a cover plate being generally rectangular in shape and formed from a conductive material;
      a plurality of channels created within the cover plate, wherein the channels is contained entirely within the cover plate;
      a pair of inlet manifolds configured to convey an air flow into the plurality of channels of the cooling system, wherein the pair of inlet manifolds is contained entirely within the cover plate, wherein a first inlet manifold of the pair of inlet manifolds extends along a first side of the cover plate, wherein a second inlet manifold of the pair of inlet manifolds extends along a second side of the cover plate, and wherein the plurality of channels extends between the first and second sides of the cover plate; and
      a pair of outlet manifolds configured to convey the air flow out of the plurality of channels of the cooling system, wherein the pair of outlet manifolds is contained entirely within the cover plate, and wherein the cover plate is separated from the plurality of battery modules at least by a bottom surface of the housing of the battery system.

12. The system of claim 11, wherein a first channel of the plurality of channels is configured to direct the air flow in a first direction, and wherein a second channel of the plurality of channels, adjacent to the first channel, is configured to direct the air flow in a second direction opposite to the first direction.

13. The system of claim 11, comprising an inlet header configured to deliver the air flow to the pair of inlet manifolds.

14. The system of claim 11, wherein the cover plate is disposed beneath the housing of the battery system.

15. The system of claim 11, comprising a gasket disposed between the cover plate and the housing of the battery system, wherein the gasket is configured to seal the air flow within the cover plate.

16. The system of claim 11, wherein a first cross-sectional area of each inlet manifold is at least four times a second cross-sectional area of each channel of the plurality of channels.

17. A battery system having a cooling system, wherein the cooling system comprises:
- a cover plate being generally rectangular in shape and formed from a conductive material;
- a plurality of channels created within the cover plate, wherein the plurality of channels is contained entirely within the cover plate;
- a pair of inlet manifolds configured to convey a coolant into the plurality of channels of the cooling system, wherein the pair of inlet manifolds is contained entirely within the cover plate, wherein a first inlet manifold of the pair of inlet manifolds extends along a first side of the cover plate, wherein a second inlet manifold of the pair of inlet manifolds extends along a second side of the cover plate, and wherein the plurality of channels extend between the first and second sides of the cover plate; and
- a pair of outlet manifolds configured to convey the coolant out of the plurality of channels of the cooling system, wherein the pair of outlet manifolds is contained entirely within the cover plate;
- wherein the plurality of channels extend over the first inlet manifold and the second inlet manifold, such that an inlet aperture in each respective channel of the plurality of channels opens downwardly into, and fluidly couples the respective channel to, either the first inlet manifold or the second inlet manifold.

* * * * *